Oct. 7, 1947.  P. F. EVERITT  2,428,416
APPARATUS FOR THE SOLUTION OF TRIANGLES
Filed Aug. 13, 1943   3 Sheets-Sheet 1
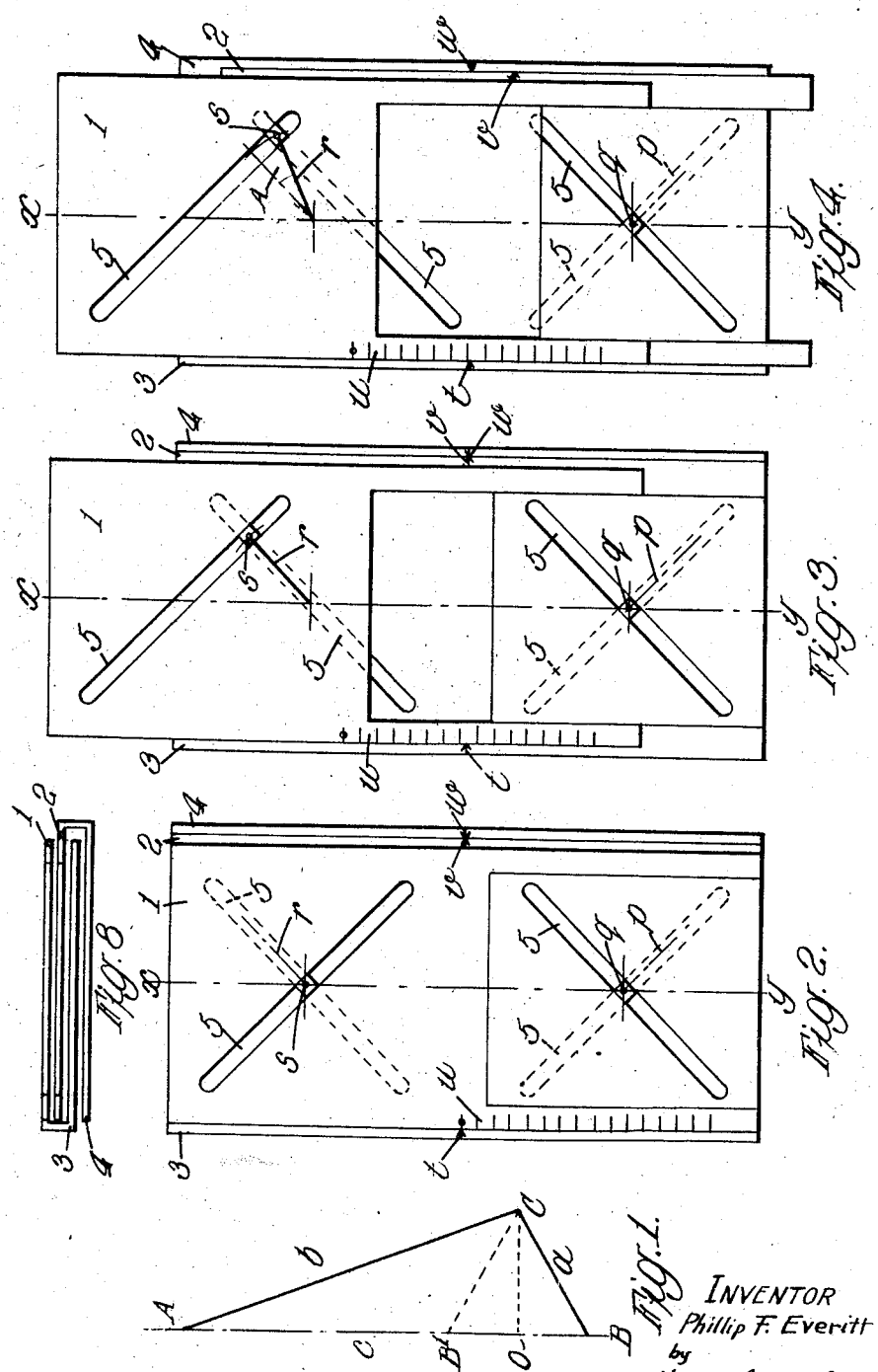
INVENTOR
Phillip F. Everitt
by
his ATTORNEYS

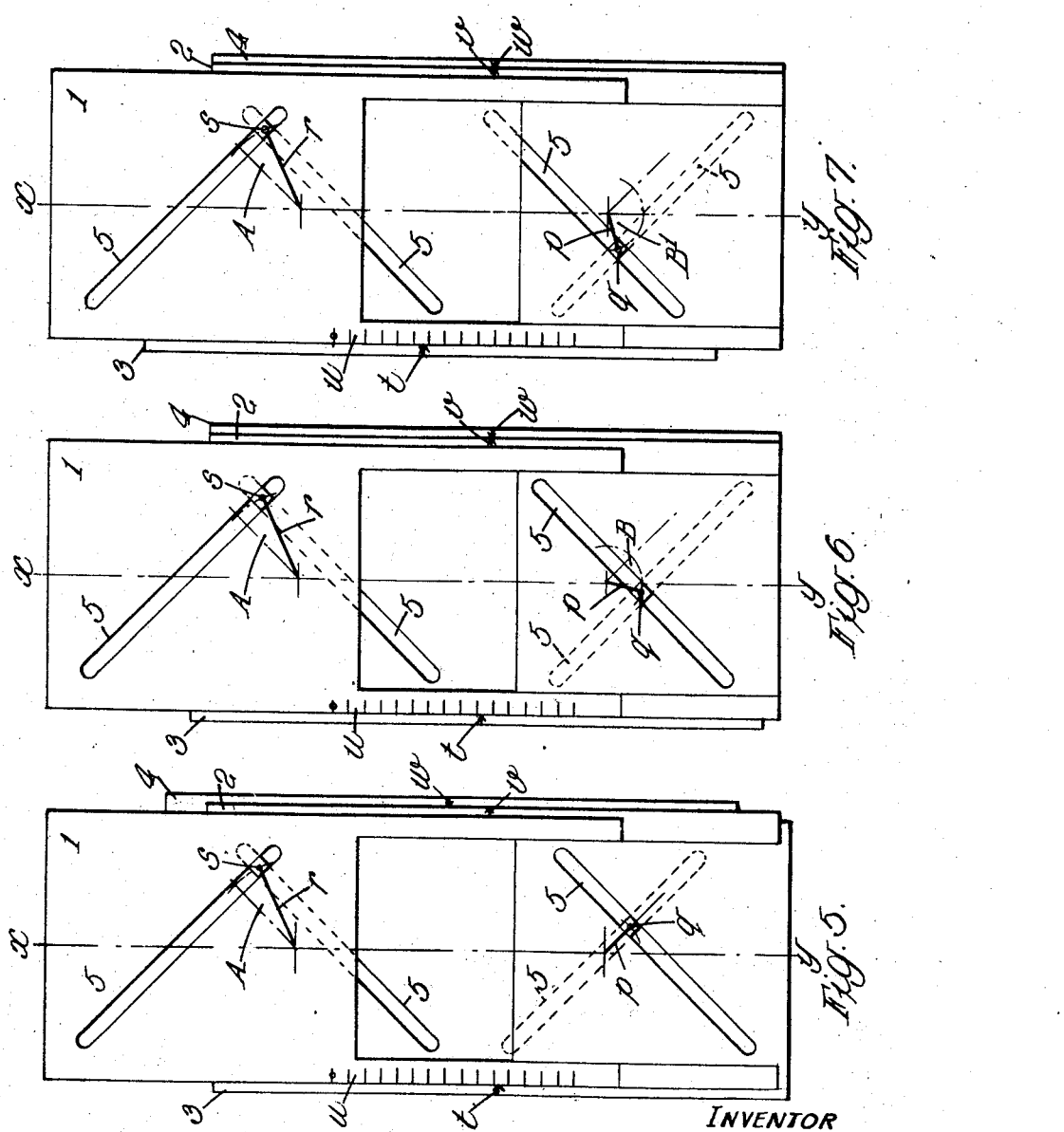

Oct. 7, 1947.  P. F. EVERITT  2,428,416
APPARATUS FOR THE SOLUTION OF TRIANGLES
Filed Aug. 13, 1943  3 Sheets-Sheet 3

INVENTOR.
PHILIP F. EVERITT
BY
Campbell, Brumbaugh & Free
his ATTORNEYS

Patented Oct. 7, 1947

2,428,416

UNITED STATES PATENT OFFICE 2,428,416

APPARATUS FOR THE SOLUTION OF TRIANGLES

Philip Francis Everitt, Ilford, England, assignor of one-half to Henry Hughes & Son Limited, London, England, a British limited liability company Application August 13, 1943, Serial No. 498,517
In Great Britain August 15, 1942

8 Claims. (Cl. 235—61)

This invention relates to improvements in apparatus for the solution of triangles, and has for its object to provide a mechanism whereby the solution of the so-called "ambiguous case" can be effected, when possible, rapidly and accurately by persons unacquainted with trigonometry.

This invention contemplates mechanism, for the solution of triangles, capable of quantitative adjustments according to available data (quantities as sides and an angle) and giving a quantitative result (or results) defining the length of the required side as well as a quantitative result (or results) defining the required angle.

The invention consists in improved apparatus, for the solution of a triangle having given two sides and the angle opposite to one of them, comprising two adjustable cranks that can be angularly displaced about parallel axes intersecting a longitudinal axis at right angles, two pairs of slides, means for coupling one crank to one pair of slides and the other crank to the other pair of slides so that when a crank is turned through an angle, one of the two slides coupled thereto is moved along the axis a distance proportional to the sine of said angle while the other of the two slides coupled thereto is moved along the axis a distance proportional to the cosine of said angle, and means for equating the movements proportional to the sines of the angles through which the cranks are turned.

In order that the nature of this invention may be the better understood it will now be described in relation to the accompanying drawings which show an example diagrammatically, reference being had to the numerals and letters of the various figures in which—

Figure 1 shows the kind of triangle to be solved;

Figures 2 to 7 inclusive, diagrammatically show the parts of a schematic arrangement in successive positions;

Figure 8 is an end view of Figure 2, and shows the disposition of certain parts;

When the two sides $a$ and $b$ and the angle A, opposite to the side $a$ of a triangle are given, there is one solution when $a$ is equal to $b$ sin A (right angled triangle) and two solutions when $a$ is greater than $b$ sin A, whilst when $a$ is less than $b$ sin A, no triangle exists with the given elements; in the solution of triangles this is called the "ambiguous case."

Such a triangle is shown in Figure 1 and for purposes of explanation it is given that the angle at A is twenty angular degrees in extent, the side $b$ is eighty units long and the side $a$ is thirty-two units long; clearly there are two solutions and the problem is to determine the extent of the angle B and the length of the side $c$ in both solutions.

Figure 9:
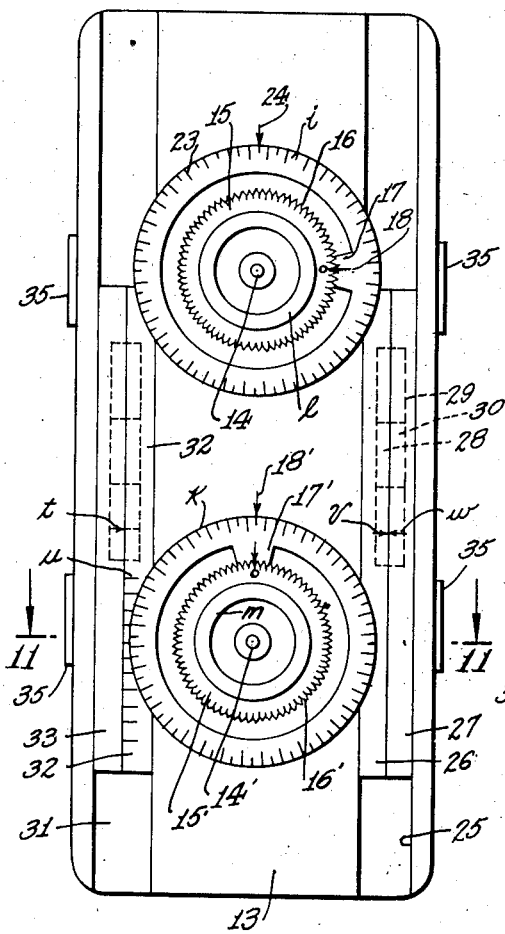
Figure 9 is a plan view of a typical form of apparatus embodying the present invention.
Figure 10:
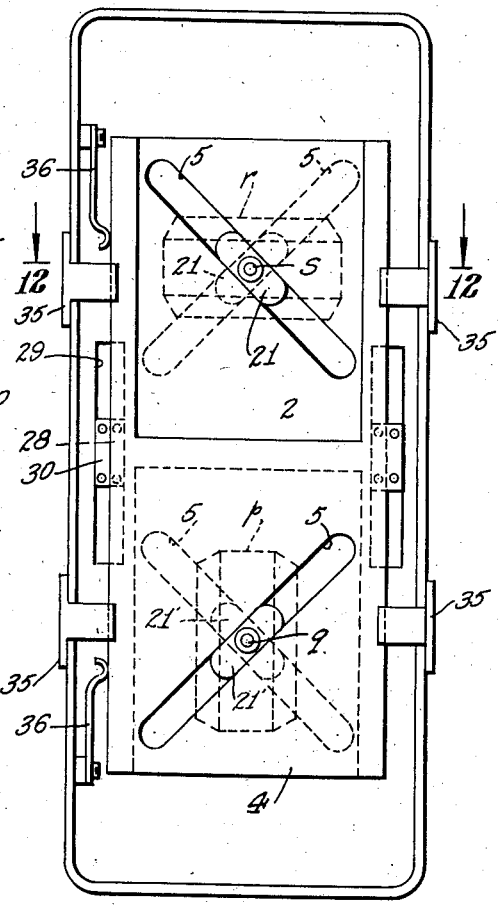
Figure 10 is a bottom plan view of the device disclosed in Figure 9, with the bottom plate removed.
Figure 11:
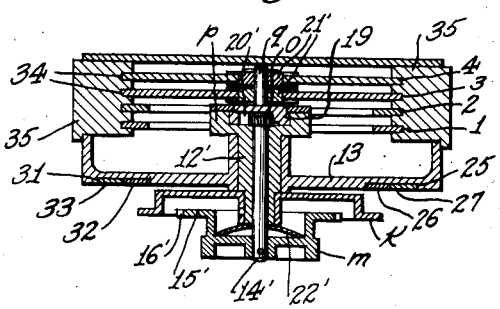
Figure 11 is a view in cross-section taken on line 11—11 of Figure 9.
Figure 12:
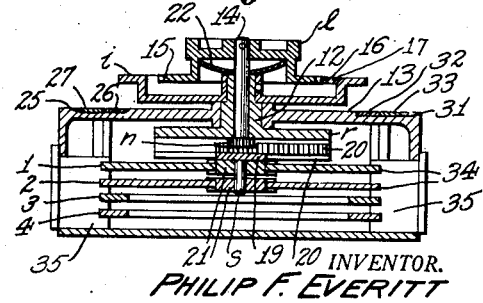
Figure 12 is a view in cross-section taken on line 12—12 of Figure 10.

From Figures 8 and 9, it will be seen that the improved apparatus comprises four plates 1, 2, 3 and 4 mounted in guides (not shown) so that each of them can move along its longitudinal axis $x$—$y$ in a horizontal plane parallel with the horizontal planes of the other plates without backlash, slack or undue friction.

Usually, the desired perfection of construction can be obtained by the use of carefully polished plane bearing surfaces and springs for maintaining contact.

The plates are divided into a pair 1 and 2 and a pair 3 and 4, the plates 1 and 2 being cut away extensively to allow the plates 3 and 4 to be operated.

Each plate is provided with a diagonal slot 5, that is to say, a slot arranged at forty-five angular degrees to the longitudinal axis $x$—$y$, the slots 5 in the plates 1 and 3 being inclined oppositely to the slots 5 in the plates 2 and 4, so that the slot 5 in the plate 1 is at right angles to the slot 5 in the plate 2 and the slot 5 in the plate 3 is at right angles to the slot 5 in the plate 4.

The edges of the plates 2 and 4 are arranged in juxta-position for example by the turning up of the margin of the plate 4 (Fig. 8), and are provided with index marks $v$ and $w$ respectively, as shown in Figures 2–7; similarly, the edges of the plates 1 and 3 are arranged in juxta-position for example by the turning up of the margin of the plate 3 (Fig. 8), the edge of the plate 1 having a scale $u$ calibrated in units of length as shown in Figures 2–7, whilst the edge of the plate 3 has an index mark $t$ as shown in Figures 2–7.

The plates 1 and 2 can be moved by a crank pin $s$ adjustable along a crank arm $r$ (indicated in Figure 2 by chain line), whilst the plates 3 and 4 can be moved by a crank pin $q$, adjustable along a crank arm $p$ (indicated in Figures 2, 3 and 4 by a chain line), the crank pin $s$ cooperating with the slots 5 in the plates 1 and 2, by means of die blocks in a manner well-known in mechanical engineering, whilst the crank pin $q$ co-operates with the slots 5 in the plates 3 and 4.

The crank arm $r$ is rotatably mounted on an axis located at the upper end of the axis $x$—$y$, whilst the crank arm $p$ is rotatably mounted on an axis, parallel with the axis of rotation of the crank arm $r$, at the lower end of the axis $x$—$y$, the distance between the axes of rotation on the axis $x$—$y$ being governed entirely by constructional limitations, as said distance has no effect upon the geometrical operation or perfection of the apparatus.

In the apparatus described above the axis $x$—$y$ is considered to represent geometrically the side $c$ of the triangle ABC, the crank arms $r$ and $p$ in final position representing in the same way the sides $b$ and $a$ respectively both for length and angle.

As the slots 5 in the plates 1 and 2 (as well as in the plates 3 and 4) are arranged at right angles to one another, any rotation of the crank pin $s$ (or the crank pin $q$) will be resolved into displacements of the plates 1 and 2 (or the plates 3 and 4), along the axis $x$—$y$ and as the slots 5 are arranged at forty-five angular degrees to the axis $x$—$y$, the starting positions of the crank arms $r$ and $p$ will be at forty-five angular degrees to the said axis.

This is the position indicated in Figure 2 and the first step towards the solution of the triangle ABC shown in Figure 1, is to adjust the crank pin $s$ along the crank arm $r$ a distance representing the length of the side $b$, that is to say, until the radius is eighty units to a convenient scale, thus setting up the disposition shown in Figure 3 where the plate 1 has been moved through a distance representing the component perpendicular to and resolved along the axis $x$—$y$ but the plate 2 has not been moved.

The crank arm $r$ is now turned in a clockwise direction through the angle A, that is to say, through twenty angular degrees, thus setting up the disposition shown in Figure 4 where both the plates 1 and 2 have been moved, the plate 1 through a distance representing the component perpendicular to and resolved along the axis $x$—$y$ and the plate 2 through a distance representing the component parallel with and resolved along the axis $x$—$y$.

The above adjustments dispose of two of the given elements, viz. the side $b$ and the angle A and to dispose of the third, viz., the side $a$, the crank pin $q$ is displaced along the crank arm $p$ a distance representing the length of the side $a$, that is to say, until the radius is thirty-two units to the scale already selected, thus setting up the disposition shown in Figure 5 where the plate 3 has been moved through a distance representing the component perpendicular to and resolved along the axis $x$—$y$ but the plate 4 has not been moved.

The triangle ABC can now be partially solved by turning the crank arm $p$ in a clockwise direction until the index $w$ coincides with the index $v$, the angle through which the crank arm $p$ has to be turned being the angle B, in the present instance about fifty-eight and three quarters angular degrees, and the relative positions of the plates 1 and 3 representing the length of the side $c$ which can be read off on the scale $u$ opposite to the index $t$, in the present instance about ninety-one and three quarter units.

Complete solution of the triangle ABC is obtained by continuing to turn the crank arm $p$ in a clockwise direction until the index $w$ (which firstly moves away from the index $v$) again coincides with the index $v$, the complete angle through which the crank arm $p$ has to be turned being the angle $B^1$, in the present instance about one hundred and twenty-one and one-quarter angular degrees; similarly, the length $AB^1$ can be read off on the scale $u$ opposite to the index $t$, in the present instance about fifty-eight and one-half units.

It must be understood that although the intercept of the scale $u$ in any final setting represents the length of the side $c$ it is not equal to that length in the dimensional units of said side.

Consider Figure 1, the triangle ABC can be solved by dropping a perpendicular from C to O, CO is common to both the right-angled triangles ACO and BCO, that is $b \sin A$ is equal to $a \sin B$ and as $a$, $b$ and A are known the angle B can be calculated with the assistance of a table of sines; $c$ is equal to AO added to OB, that is $b \cos A$ added to $a \cos B$. The instant invention computes $b \cos A$, $b \sin A$, $a \sin B$ and $a \cos B$ mechanically; enables the angle B to be determined by equating $a \sin B$ to $b \sin A$ and enabling $c$ to be determined by adding $b \cos A$ and $a \cos B$ for one solution and subtracting $a \cos B$ from $b \cos A$ for the other solution.

The normal position of the parts is indicated in Figure 2 and the first step towards the solution of the triangle ABC shown in Figure 1 is to adjust the crank pin $s$ along the crank arm $r$ a distance $kb$ (where $k$ is the convenient scale) representing the length of the side $b$, that is to say until the radius is eighty units, thus setting up the disposition shown in Figure 3 where only the cosine slide 1 has been moved along the axis $x$—$y$, the sine slide 2 remaining stationary.

The crank arm $r$ is now turned in a clockwise direction through the angle A, that is, through twenty angular degrees, thus setting up the disposition shown in Figure 4, where the cosine slide 1 has been moved upwardly from the position shown in Figure 2, a distance equal to:

$$kb \sin (45°+A) + kb \cos (45°+A)$$

which can be written:

$$kb (\sin 45° \cos A + \cos 45° \sin A + \cos 45° \cos A - \sin 45° \sin A)$$

as the ratio of sin 45° and cos 45° is .70711 the above can be simplified to:

$$.70711\ kb\ (2 \cos A)$$

that is:

$$1.41422\ kb \cos A \qquad (1)$$

a distance proportional to $b \cos A$.

At the same time the sine slide 2 has been moved downwardly from the position shown in Figure 2 a distance equal to:

$$kb \sin (45°+A) - kb \cos (45°+A)$$

which can be written:

$$kb (\sin 45° \cos A + \cos 45° \sin A - \cos 45° \cos A + \sin 45° \sin A)$$

and simplified to:

$$.70711\ kb\ (2 \sin A)$$

that is:

$$1.41422\ kb \sin A \qquad (2)$$

a distance proportional to $b \sin A$.

The above adjustments dispose of two of the given elements, viz., the side $b$ and the angle A and to dispose of the third, viz., the side $a$ the crank pin $q$ is displaced along the crank arm $p$ a distance $ka$ representing to scale the length of the side $a$, that is to say, until the radius is thirty-two units, thus setting up the disposition shown in Figure 5, where only the cosine slide 3 has been moved along the axis $x$—$y$, the sine slide 4 remaining stationary.

The triangle ABC can now be partially solved by turning the crank arm $p$ in a clockwise direction, thus moving the sine slide 4 downwardly from the position shown in Figure 2 a distance equal to:

$$ka \cos (B-45°) + ka \sin (B-45°)$$

which can be written:

$$ka (\cos B \cos 45° + \sin B \sin 45° + \sin B \cos 45° - \cos B \sin 45°)$$

and simplified to:

$$.70711 \, ka \, (2 \sin B)$$

that is:

$$1.41422 \, ka \sin B \quad (3)$$

a distance proportional to $a \sin B$ and when (2) is equal to (3) the crank arm $p$ will have been turned through the angle B. Thus it follows that when the index $w$ on the sine slide 4 again coincides with the index $v$ on the sine slide 2, the crank arm $p$ will have been turned through the angle B, in the present instance about fifty-eight and three-quarter angular degrees.

This angular displacement of $p$ will move the cosine slide 3 through a distance downwardly from the position shown in Figure 2 equal to:

$$ka \cos (B-45°) - ka \sin (B-45°)$$

which can be written:

$$ka (\cos B \cos 45° + \sin B \sin 45° - \sin B \cos 45° + \cos B \sin 45°)$$

and simplified to:

$$.70711 \, ka \, (2 \cos B)$$

that is:

$$1.41422 \, ka \cos B \quad (4)$$

a distance proportional to $a \cos B$.

As the cosine slide 1 was moved upwardly (1) is to be added to (4) so that the relative movement of the cosine slides 1 and 4 is:

$$1.41422 \, k \, (b \cos A + a \cos B) \quad (5)$$

that is proportional to the length of the slide $c$, a length that can be read off on the scale $u$ opposite to the index $t$, in the present instance about ninety-one and three-quarter units.

Complete solution of the triangle ABC is obtained by continuing to turn the crank arm $p$ in a clockwise direction until the index $w$ (which firstly moves downwardly away from the index $v$ and then upwardly towards the index $v$) again coincides with the index $v$, the complete angle through which the crank arm $p$ has been turned being the angle $B^1$, see Figure 1 that is, until:

$1.41422 \, kb \sin A$ is equal to $1.41422 \, ka \sin B^1$ in the present instance $B^1$ is about one hundred and twenty-one and one-quarter angular degrees.

This last adjustment also moves the cosine slide 4 upwardly from the position shown in Figure 2 a distance equal to:

$$ka \cos (B^1-45°) - ka \sin (B^1-45°)$$

that is:

$$1.41422 \, ka \cos B^1 \quad (6)$$

As the cosine slides 1 and 4 have both moved upwardly the relative movement is:

$$1.41422 \, k \, (b \cos A - a \cos B) \quad (7)$$

because $B^1$ and B are always supplementary angles.

Thus according to (1), (4) and (6) it is shown that the slides 1 and 4 move distances proportional to the cosines of the angles through which the operating cranks are turned; also, according to (2) and (3) it is shown that the slides 2 and 3 move distances proportional to the sines of the angles through which the operating cranks are turned; and according to (5) and (7) it is shown that the direction of the movements of the slides 1 and 4 enable indications of the sum and difference of the cosines to be obtained.

The values of $k$, $a$, $b$ and A are applied to the apparatus so that the valves of $c$, B and $B^1$ can be ascertained by inspection from the scale $u$ and dial $k$.

A typical form of device embodying the present invention and including the elements described above is illustrated in Figures 9–12.

The crank arm $r$ is illustrated as a slotted cross-head mounted on a hollow shaft 12 that is journaled in the upper part of a rectangular, hollow casing 13. The shaft 12 carries a dial $i$ graduated in angular degrees.

The shaft 12 receives a concentric spindle 14 having a knob 1 on its outer end and a pinion $n$ on its inner end. The knob 1 has a circular plate 15 fixed thereto graduated in units suitable for representing the values of the side $b$ of the triangle $abc$ and provided with fine V-shaped teeth 16 (one tooth for each graduation) on its periphery for cooperation with a toothed projection 17 mounted on the dial $i$. The projection 17 is provided with an index mark 18.

The slotted cross-head $r$ receives a carriage 19 provided with a rack 20 that meshes with the pinion $n$. The crank pin $s$ is fixed to the carriage 20 and projects downwardly therefrom. The crank pin is fitted with two guide blocks 21 that turn freely thereon and engage in the slots 5 in the right-angularly related slots in the slides 1 and 2.

The spindle 14 has limited free endwise movement in the spindle 12 and is normally urged outwardly by means of a spring washer 22 so that the teeth on the plate 15 and the projection 17 normally tend to engage. The knob is depressed to free the teeth 16 from the teeth of the projection 17 and rotated to turn the pinion $n$ to project or retract the rack 20 and displace the crank pin $s$ radially through a distance proportional to the length of one of the sides of the triangle sought to be solved, as explained before. When the knob 1 is released, the spring urges the teeth 16 into engagement with the teeth of the projection 17 to lock the knob to the dial $i$. The dial $i$ can then be rotated to adjust the crank to the known angle of the triangle, as shown by the graduations 23 and the index 24.

The arrangement of the crank arm $p$ is exactly the same as that of the crank arm $r$ inasmuch as the crank pin $q$ is mounted on a carriage 19' provided with a rack 20', that meshes with and is actuated by means of the pinion $o$. Guide blocks 21' are mounted in the pin $q$. The pinion $o$ is fixed to the shaft 14' that carries the knob $m$ and is rotatable and shiftable axially with respect to the shaft 12'. The angle-setting knob $k$ is fixed to the shaft 12'. The knob $m$ is provided with locking and setting teeth 16' that co-operate with the teeth on the projection 17' and a scale graduated in degrees cooperating with the index 18'.

In the right hand side of the top of the casing 13, there is a longitudinal groove 25 in which the two cover plates 26 and 27 are arranged. The cover plate 26 carries the index V and is connected to the cosine slide 2 by means of a projection 28 passing through a slot 29 in the casing. The cover plate 27 carries the index w and is connected to the cosine slide 4 by means of a projection 30, also passing through the slot 29.

The left hand side of the top of the casing also is provided with a groove 31 in which are mounted the two cover plates 32 and 33 that are respectively connected to the sine slides 1 and 3 in the manner described above. The plate 33 is provided with the index marker t and the plate 32 is provided with the scale u.

The sine slides 1 and 3 and the cosine slides 2 and 4 are guided in grooves 34 in the four blocks 35 fixed in the casing. Pairs of springs 36 bear against the edges of each of the slides 1, 2, 3 and 4 to eliminate backlash or slack.

Obviously the constructional details can be modified and any type of adjustable crank may be used and any equivalent construction may be adopted for adjusting the crank. Therefore, the form of the invention described above should be considered as illustrative and not as limiting the scope of the following claims.

I claim:

1. An apparatus for solving triangles having two known sides and a known angle opposite to one of said sides, comprising two pairs of substantially parallel slides, movable relatively to each other along parallel axes, two cranks angularly adjustable about parallel axes substantially perpendicular to the axes of movement of said slides, each crank having a crank arm of adjustable length, means coupling one of said cranks to one pair of slides, means coupling the other crank to the other pair of slides, said coupling means upon angular adjustment of a crank acting to shift one of the pair of slides coupled to the crank a distance proportional to the sine of an angle through which the crank is rotated and for shifting the other slide a distance proportional to the cosine of said angle, and means for indicating the extent of relative movement between the two slides of each pair of slides.

2. An apparatus for solving triangles having two known sides and a known angle opposite to one of said sides, comprising two pairs of substantially parallel slide members movable relatively to each other along parallel axes, each pair of slides having right-angularly related slots therein, two cranks angularly adjustable about parallel axes substantially perpendicular to said slides, a crank pin on one of said cranks engageable in the slots of one of said pairs of slide members, a crank pin engageable in the slots in the other pair of slide members, means for adjusting said crank pins radially with respect to the axes of rotation of said cranks, whereby adjustment of a crank through an angle shifts one of the slides in engagement therewith through a distance proportional to the sine of said angle, and the other slide through a distance proportional to the cosine of said angle, and means for indicating the extent of relative movement between the two slides of each pair of slides.

3. An apparatus for solving the triangles having two known sides and a known angle opposite to one of said sides, comprising two pairs of substantially parallel slide members movable relatively to each other along parallel axes, each pair of slides having right-angularly related slots therein extending at about 45° to the axes of movement of said slides, two cranks angularly adjustable about parallel axes substantially perpendicular to said slides, a crank pin on one of said cranks engageable in the slots of one of said pairs of slide members, a crank pin engageable in the slots in the other pair of slide members, means for adjusting said crank pins radially with respect to the axes of rotation of said cranks, whereby adjustment of a crank through an angle shifts one of the slides in engagement therewith through a distance proportional to the sine of said angle, and the other slide through a distance proportional to the cosine of said angle, and means for indicating the extent of relative movement between the two slides of each pair of slides.

4. An apparatus for solving triangles having two known sides and a known angle opposite to one of said sides, comprising a first pair of substantially parallel slide members, a second pair of substantially parallel slide members, means supporting said slide members for parallel movement along parallel axes, a crank corresponding to each pair of slide members adjustable angularly about an axis substantially perpendicular to said slide members, a crank pin on each crank adjustable radially with respect to the axis of the latter, means for adjusting said crank pin radially, means forming right-angularly related guideways on said first pair of slide members engaging the crank pin on one of said cranks, means forming right-angularly related guideways on said second pair of slide members, engaging the crank pin on the other crank member, whereby rotation of said cranks causes relative axial movements of the slides engaged thereby, and means for indicating the extent of relative movement between the two slides of each pair of slides.

5. An apparatus for solving triangles having two known sides and a known angle opposite to one of said sides, comprising a first pair of substantially parallel slide members, a second pair of substantially parallel slide members, means supporting said slide members for parallel movement along parallel axes, a crank corresponding to each pair of slide members adjustable angularly about an axis substantially perpendicular to said slide members, a crank pin on each crank adjustable radially with respect to the axis of the latter, means for adjusting said crank pin radially a distance proportional to the length of one of said sides of said triangle, means for indicating the angular movement of said cranks, means forming right-angularly related guideways on said first pair of slide members engaging the crank pin on one of said cranks, means forming right-angularly related guideways on said second pair of slide members engaging the crank pin on the other crank member, whereby rotation of said cranks causes relative axial movement of the slides engaged thereby, and means for indicating the extent of relative movement between the two slides of each pair of slides.

6. An apparatus for solving triangles having two known sides and a known angle opposite to one of said sides, comprising a support, two pairs of substantially parallel slide members, means on said support guiding said slide members for movement along substantially parallel axes, each pair of slide members having right-angularly related slots therein inclined at about a 45° angle to said axes, a pair of crank members rotatably mounted on said support for angular adjustment about axes substantially perpendicular to said slide members, a radially adjustable crank pin on each crank, the pin on one of said cranks engaging in the slots of one of said pairs of slide members and the other engaging in the slots of the other pair of slide members, means for adjusting said crank relatively to the axes of rotation of said cranks through distances proportional to the length of said known sides of said triangle, means for indicating the angular adjustment of said cranks, and means for indicating the relative displacements of two of the slide members of different pairs.

7. An apparatus for solving triangles having two known sides and a known angle opposite to one of said sides, comprising a support, two pairs of substantially parallel slide members, means on said support guiding said slide members for movement along substantially parallel axes, each pair of slide members having right-angularly related slots therein inclined at about a 45° angle to said axes, a pair of spindles rotatably mounted on said support substantially perpendicular to said axes of movement of said slide members, a rack carried by each spindle and extending substantially perpendicular to said spindle, a pinion engaging said rack, means for rotating said pinion to project and retract said rack, means locking said pinion against rotation, a crank pin on said rack, a pin on one of said racks engaging the slots of one pair of slide members, and the other crank pin engaging the slots of the other pair of slide members.

8. An apparatus for solving triangles having two known sides and a known angle opposite to one of said sides, comprising a support, two pairs of substantially parallel slide members, means on said support guiding said slide members for movement along substantially parallel axes, each pair of slide members having right-angularly related slots therein inclined at about a 45° angle to said axes, first and second spindles rotatably mounted on said support substantially perpendicular to the axes of said movement of said slide members, a rack member on each of said first and second spindles and movable substantially perpendicular thereto, other spindles concentric with and movable axially in each of said first and second spindles, a pinion on each of said other spindles meshing with the corresponding rack member, locking means on said concentric spindles engageable and disengageable by relative axial movement of said concentric spindles, a crank pin on each of said racks, one of said crank pins engaging in the slots of one of said pairs of slide members and the other engaging in the slots of the other pair of slide members.

PHILIP FRANCIS EVERITT.

REFERENCES CITED

The following references are of record in the file of this patent:

UNITED STATES PATENTS

| Number | Name | Date |
|---|---|---|
| 1,487,460 | Hansson | Mar. 18, 1924 |
| 1,502,794 | Mouren | July 29, 1924 |
| 1,983,961 | Araujo | Dec. 11, 1934 |
| 2,200,130 | Lewis et al. | May 7, 1940 |
| 2,220,399 | Fagerholm | Nov. 5, 1940 |

FOREIGN PATENTS

| Number | Country | Date |
|---|---|---|
| 647,435 | Germany | July 12, 1937 |